US007271337B2

(12) United States Patent
Le Mon

(10) Patent No.: US 7,271,337 B2

(45) Date of Patent: Sep. 18, 2007

(54) SECURITY BLOCK FOR A COMMUNICATIONS CONNECTOR

(75) Inventor: Lawrence M. Le Mon, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 11/286,040

(22) Filed: Nov. 23, 2005

(65) Prior Publication Data

US 2007/0114054 A1 May 24, 2007

(51) Int. Cl.
*H02G 13/00* (2006.01)

(52) U.S. Cl. ............................ 174/61; 174/50; 174/64; 174/135; 439/373; 439/135

(58) Field of Classification Search .................. 174/61, 174/117 R, 50, 117 F, 53, 59, 64, 11 R, 135; 439/629, 946, 362, 296, 373, 345, 371, 304, 439/135

See application file for complete search history.

(56) References Cited

U.S. PATENT DOCUMENTS 6,519,208 B2 * 2/2003 DeVries ........................ 174/66
6,589,064 B1 * 7/2003 Chen ........................... 439/304
6,688,903 B2 * 2/2004 Kakinoki et al. ........... 439/362
7,083,438 B2 * 8/2006 Massaro et al. ............ 439/304
7,140,903 B2 * 11/2006 Pulizzi et al. ............... 439/371

* cited by examiner

*Primary Examiner*—Angel R. Estrada
(74) *Attorney, Agent, or Firm*—Thomas F. Lenihan

(57) ABSTRACT

A security block for securing I/O ports of an electronic instrument physically prevents any breach of data through a protected I/O port, such as a USB port, by securing cables that may be plugged into the port by means of a locked cover. The cables are prevented from being removed and USB memory devices are prevented from being connected in their place. In a second aspect, a portion of the security block covers unused I/O ports thereby preventing USB memory devices and other devices from being connected to unoccupied I/O ports. The locking mechanism can be either a padlock, or a locking screw, or the like.

18 Claims, 4 Drawing Sheets

SECURITY BLOCK FOR A COMMUNICATIONS CONNECTOR

FIELD OF THE INVENTION

The subject invention generally concerns the field of electronic equipment having a communications connector, and specifically concerns apparatus for preventing unauthorized access to that connector.

BACKGROUND OF THE INVENTION

There are organizations and companies in existence that may need to maintain a high degree of security with respect to the information resident on their employees' computers. Electronic transmissions can be limited, such that, transmission to unauthorized destinations may be blocked. Such a company may also want to prevent the making of copies of confidential or secret data For example, such a company may mandate that none of its computers may include a drive for recording of data onto removable memory media. Such a drive may be, for example, a floppy disk drive, or a CD-ROM burner. In this way, no person could access the computer, write confidential or secret data to removable media, and then abscond with that confidential or secret data.

It is herein recognized that modern technology has provided yet another way to write data from a computer to a removable medium. Unfortunately, this technology cannot be so easily banished from the computer. That technology is the USB port. One may think that a simple change to the operating system software to "turn-off" USB capability would solve this problem. However, many computer peripherals are connected to modern computers via the USB port, including keyboards and computer mice. The removable medium to be controlled in this case is the USB thumb drive, also known as, a USB flash drive, among other names.

The task at hand is to prevent the use of such USB thumb drives, while at the same time, permitting the use of USB keyboards and other legitimate USB devices.

SUMMARY OF THE INVENTION

The security block of the subject invention physically prevents any breach of data through a protected I/O port, such as a USB port, by securing cables that may be plugged into the port by means of a locked cover. The cables are prevented from being removed and USB memory devices are prevented from being connected in their place.

In a second aspect of the invention, a portion of the security block covers unused I/O ports thereby preventing USB memory devices and other devices from being connected to the unoccupied I/O ports.

In one embodiment of the invention the locking mechanism is, for example, a padlock; in a second embodiment of the invention, one or more locking screws may be used as the locking mechanism.

DETAILED DESCRIPTION OF THE EMBODIMENTS

Figure 1:
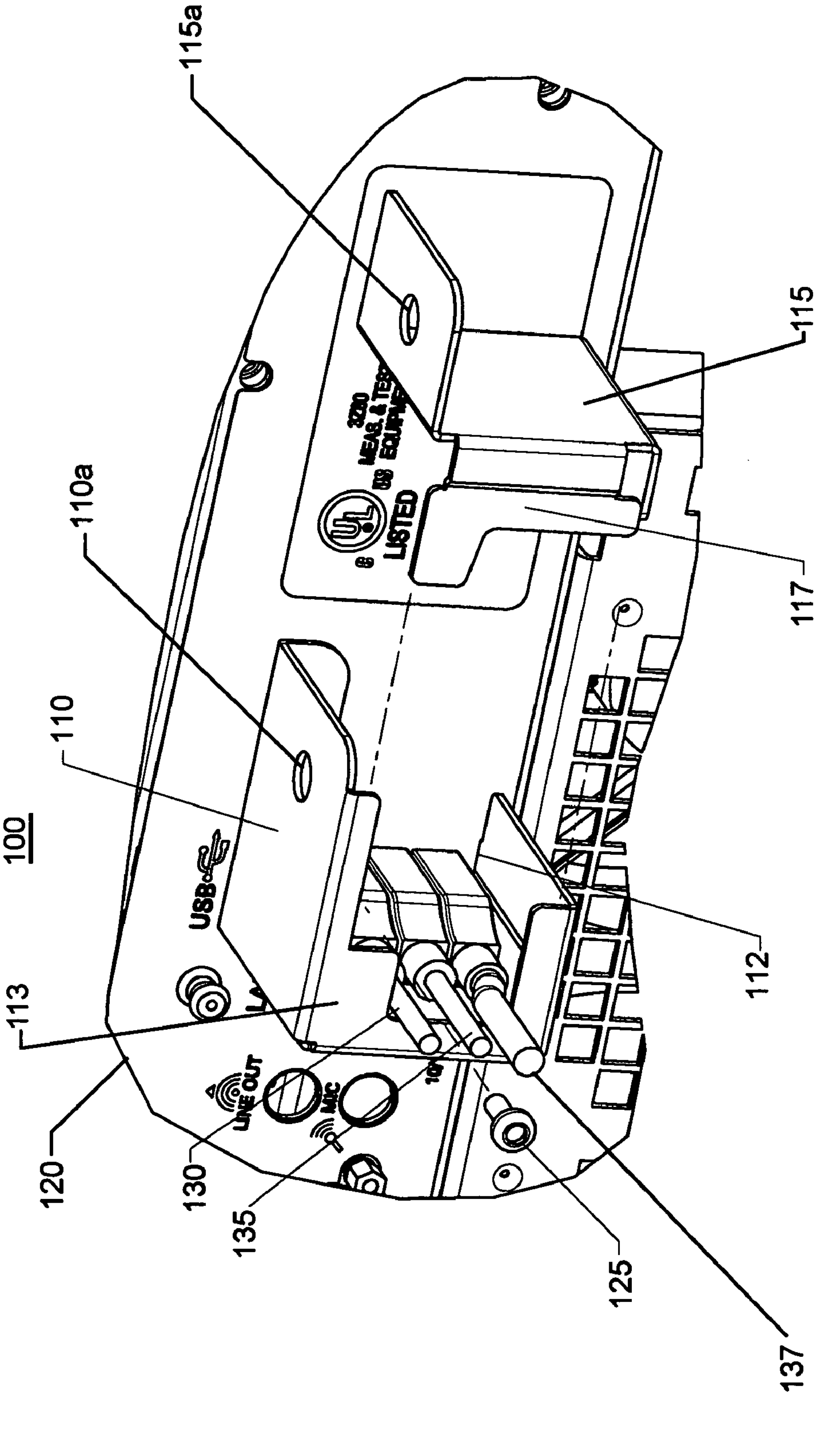
FIG. 1 shows, in pictorial form, a portion of a wall of an electronic instrument, and apparatus according to the subject invention in an open position.

In the following detailed description, one skilled in the art will recognize that similar reference numerals in the drawing serve similar functions and need not be described repeatedly.

It is herein recognized that many modern test and measurement instruments, such as oscilloscopes and logic analyzers, include a pc motherboard (i.e., a personal computer) which may run standard computer software, as well as software tailored to the measurement task at hand. Other electronic equipment may also include such a pc motherboard. Thus, the security risk described above with respect to a personal computer (i.e., desktop, or pc), may also equally apply to modern test and measurement instruments or other electronic equipment.

Referring to FIG. 1, a Security Block 100 of the subject invention comprises two sheet metal parts, a primary housing 110, and a secondary housing (i.e., locking cover) 115 that fit over at least one USB port mounted on a mother board of an electronic instrument 120. Electronic instrument 120 may be a PC, a consumer electronics unit, or a test and measurement instrument, such as, a logic analyzer or oscilloscope, for example.

Primary housing 110 is preferably made of sheet metal, for example, steel (although another suitable strong material, such as aluminum, titanium, or even acrylic may be used), and is formed in a generally rectangular shape. That is, a primary housing 110 has two right angle bends formed in it to make an enclosure having three closed sides. The three closed sides are generally perpendicular to the wall of electronic instrument 120. Primary Housing 110 has one open side, and a rear-facing side portion 113. Rear facing side portion 113 has an opening formed in it that beginning from an area approximately overlaying the USB ports and extending to the open end of primary housing 110. Primary Housing 110 is preferably fixed to the wall of electronic instrument 120 by means of at least one screw 125 and by a combination of a tab 112 of primary housing 110 and a corresponding slot in the wall of electronic instrument 120. Three USB cables, 130, 135, 137 are shown passing through the opening in primary housing 110 and connected to USB ports of electronic instrument 120. Primary housing 110 has an aperture (i.e., a hole) 110*a* formed in it, the use of which will be discussed below.

Locking cover 115 is preferably made of sheet metal (although another suitable strong material may be used), and is formed in a shape that in combination with primary housing 110 achieves a generally closed rectangular shape. That is, locking cover 115 has two opposite right angle bends formed in it to make a z-shaped structure having three sides. The three sides are generally perpendicular to the wall of electronic instrument 120. Locking cover 115 has a rear-facing side portion 117. Rear-facing side portion 117 has an opening formed in it that causes it to appear generally L-shaped. Locking cover 115 is preferably sized to slide into the open side of primary housing 110, thus providing the missing closed wall needed to surround the USB ports of electronic instrument 120. Locking cover 115 has an aperture (i.e., a hole) 115*a* formed in it, the use of which will be discussed below.

Figure 2:
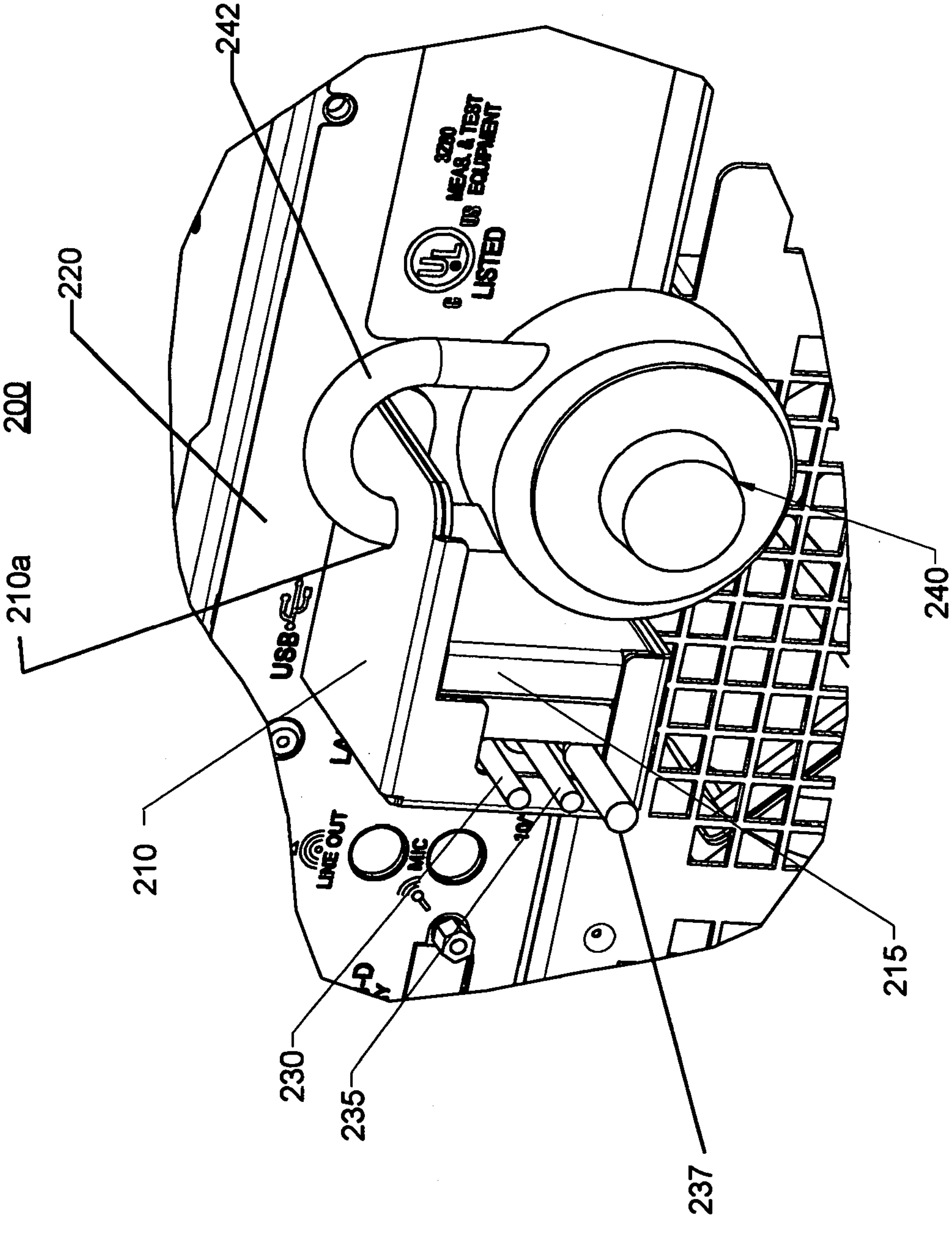
FIG. 2 shows, in pictorial form, a portion of a wall of an electronic instrument, and apparatus according to the subject invention in a engaged and locked position.

Referring to FIG. 2, primary housing 210 is shown installed over the USB ports, followed by its locking cover 215, which locking cover 215 is shown in its engaged (i.e., closed) position. When locking cover 215 is installed in its engaged position, cable 230, 235 are trapped in position by the close proximity of top portions 212, 217 of security block 200, and apertures 210*a* and 215*a* (not shown) are axially aligned. Locking cover 215 is locked in place using, for example, a standard padlock 240 having a shackle 242, preferably having a 9/32" shackle dimension, wherein shackle 242 is inserted through aligned apertures 210*a* and 215*a*. When locking cover 215 is in its engaged (i.e., closed) position, primary housing 210 cannot be removed from the wall of electronic instrument 220 because screw 125 of FIG. 1 is also covered and is no longer accessible.

There may be additional, unused, USB ports covered by closed arrangement of primary housing 210 and locking cover 215. In such a case, the intent would be to deny access to all but, for example, three USB ports on electronic instrument 220, which receive USB cables 230, 235, 237 coupled to legitimate peripheral devices, such as a keyboard and a mouse (not shown). These ports can only be accessed by opening padlock 240 and removing locking cover 215. Opening security block 200 in this manner allows the customer to install mouse and/or keyboard plugs 230, 235, and then lock them in place, so that they cannot be removed. Now, electronic instrument 220 can be operated with mouse and keyboard, and no other devices can be plugged into its USB ports.

Security block 200 may be made large enough to cover any reasonable number of USB ports, for example, four ports. The invention allows a predetermined subset of these USB ports, or all of them, to be used, where any cables plugged into the used ports are locked in place, and any unused ports are blocked, such that another cable cannot be connected. In this way, USB memory devices cannot be connected to the USB ports of the computer or instrument without unlocking security block 200, and for security purposes, the combination or key to padlock 240 would not be accessible to the user.

Figure 3:
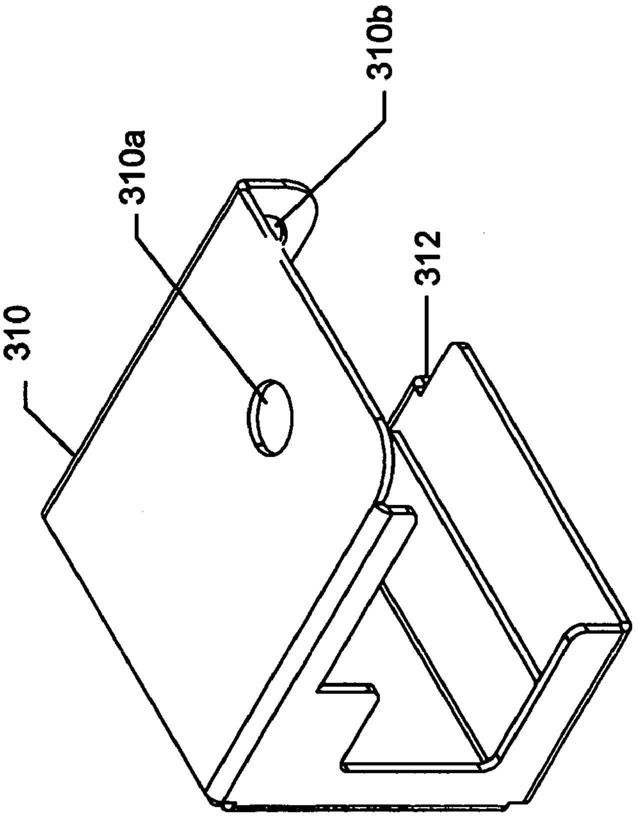
FIG. 3 shows, in perspective view, a portion of the apparatus of FIGS. 1 and 2.

FIG. 3 shows, in perspective view, an illustration of primary housing 310. Note that, in this view, one can see that primary housing 310 has an additional aperture, (i.e., hole) 310*b*. Hole 310*b* is a channel through which screw 125 of FIG. 1 is connected to the wall of electronic instrument 120. Tab 312 is intended to be inserted into a corresponding slot in the wall of electronic instrument 120. As noted above, if desired, more than one screw may be used to attach primary housing 310 to electronic instrument 120. Moreover, any such means of attachment will suffice, such as a rivet, or even a weld.

Figure 4:
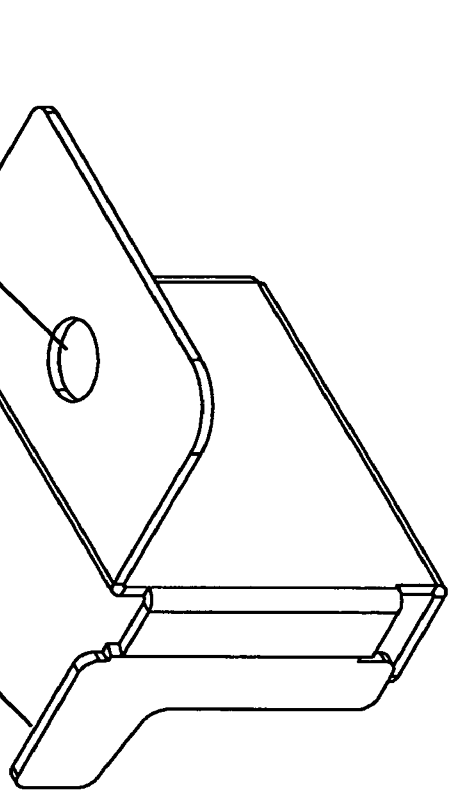
FIG. 4 shows, in perspective view, a further portion of the apparatus of FIGS. 1 and 2.

FIG. 4 shows, in perspective view, an illustration of secondary housing, or locking cover, 415. In this view, one can see more clearly the bends in member 415 that serve as the missing fourth side of primary housing 410 when locking cover 415 is installed in its engaged position.

Figure 5:
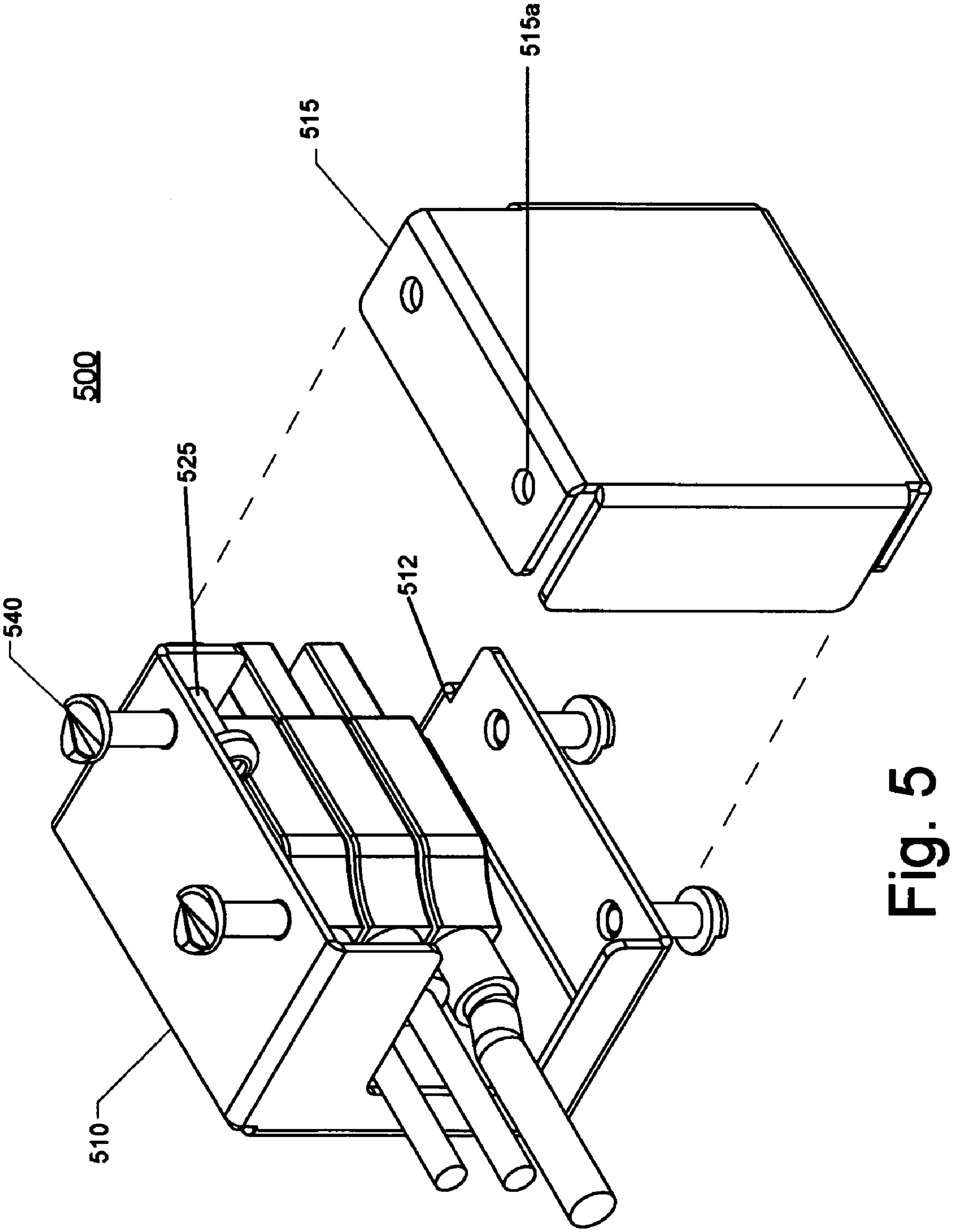
FIG. 5 shows, in perspective view, a second embodiment of the invention.

A second embodiment of the invention is shown in FIG. 5. The security block 500 of FIG. 5 comprises a primary portion 510 and a locking cover 515, and employs at least one locking screw 540, and preferably more, as the locking mechanism instead of requiring the use of padlock 240. Locking screws 540 may be of any of a variety of commercially available screws having a head modified for easy insertion and difficult or impossible extraction. One such locking screw is a one way screw manufactured by Tamperproof Screw Co. Inc., Hicksville, N.Y. In this manner, the two portions 510, 515 of the security block are engaged to form a complete enclosure and are locked together with a device that is not reasonable removable by the average user. If desired, the locking screw chosen can be of a type that is removable by an authorized individual in possession of a special tool designed for that purpose. One such a removable security screw is the Keyed-Lok® screw manufactured by Bryce Fastener Mfg. Inc., Gilbert, Ariz. In this case, the security screw or screws can be removed, and the cables changed, reasonably quickly, when required.

What has been described is a two-portion lockable security block that allows use of certain ones of a plurality of USB ports while blocking access to others. An advantage of the subject invention is that when security block 100 is affixed to electronic instrument 120 with screw 125, it is removable. Because it is removable, it can be taken off of electronic instrument 120, for use on another instrument in the event that electronic instrument 120 is moved to a area having lesser, or no, security requirements. A further advantage provided by security block 100, is that devices using the permitted USB connectors may be easily changed in the event that they become defective. To understand why this is particularly advantageous, consider the following. One could imagine a security system in which the keyboard and mouse were "hardwired in", only to find at a later date, that a key has ceased to work properly. Such a situation would cause lost time, and extra expense, both of which are avoided by use of the subject invention.

One skilled in the art will recognize that the subject invention can be applied to I/O ports other than a USB I/O port on a variety of electrical instruments, as needed for security purposes. Moreover, one skilled in the art will recognize that the subject invention may use a different form of lock than that used in the described embodiment. The term "enclose" as used with respect to the primary housing in the following claims means to "wall" and is not intended to mean "surround" (i.e., not closed by all sides). The I/O ports are surrounded when the two security block portions 110, 115 are engaged.

One skilled in the art will also realize that cover portion 115 can be adapted to be mounted to the wall of instrument 120 instead of primary portion 110. Thus, the "three-sided" portion will be removable and the "single-sided" portion will be fixed. Moreover, one skilled in the art will note that primary portion 110 and cover portion 115 may be formed such that each form two sides the square that is completed upon assembly. The only requirement on this point is that at least one side of security block 100 be fixed to the wall of instrument 120. These and other modifications are intended to be covered by the following claims.

What is claimed is:

1. A securing mechanism for limiting access to at least a first I/O port of an electronic instrument, comprising:

a primary housing mounted on said electronic instrument adjacent to said I/O port, said primary housing enclosing said I/O port on three sides and being open on a fourth side;

said primary housing having a cover including an aperture for receiving a an I/O connector to be connected to said I/O port;

a secondary housing mechanically coupling with said primary housing in an engaged position to enclose the open fourth side;

said secondary housing having a cover cooperating with said cover of said primary housing to reduce said aperture to a size smaller than said I/O connector, said reduced size of said aperture allowing passage of a cable of said I/O connector through said coupled primary and secondary housings when said I/O connector is connected to one of said I/O ports when said secondary housing is in said engaged position;

said primary housing and said secondary housing cooperating when said secondary housing is in said engaged position to prevent removal of said I/O connector from said I/O port; and a locking mechanism for locking said secondary housing in said engaged position.

2. The securing mechanism of claim 1, wherein said secondary housing slides within said primary housing.

3. The securing mechanism of claim 2, wherein a portion of said primary housing has a second aperture, a portion of said secondary housing has a third aperture; and said second and third apertures are axially aligned when said secondary housing is in said engaged position;

said second and third apertures receiving a portion of said locking mechanism when said secondary housing is in said engaged position.

4. The securing mechanism of claim 3, wherein said locking mechanism is a padlock.

5. The securing mechanism of claim 3, wherein said locking mechanism is a locking screw.

6. A securing mechanism for limiting access to a plurality of I/O ports of an electronic instrument, comprising:

a primary housing mounted on said electronic instrument adjacent to said plurality of I/O ports, said primary housing having three sides for enclosing said plurality of I/O ports and being open on a fourth side;

said primary housing having a cover including an aperture for receiving an I/O connector to be connected to one of said I/O ports;

a secondary housing adapted to mechanically coupling to said primary housing in an engaged position to enclose said open fourth side;

said secondary housing having a cover cooperating with said cover of said primary housing to reduce said aperture to a size smaller than said I/O connector, said reduced size of said aperture allowing passage of a cable of said I/O connector through said coupled primary and secondary housings when said I/O connector is connected to one of said I/O ports, when said secondary housing is in said engaged position;

said primary housing and said secondary housing cooperating when said secondary housing is in said engaged position to prevent removal of said I/O connector from an occupied one of said I/O ports and to prevent connection of another I/O connector to an unoccupied one of said I/O ports; and a locking mechanism for locking said secondary housing in said engaged position.

7. The securing mechanism of claim 6, wherein said secondary housing slides within said primary housing.

8. The securing mechanism of claim 7, wherein a portion of said primary housing has a second aperture, a portion of said second housing has a third aperture; and said second and third apertures are axially aligned when said secondary housing is in said engaged position;

said second and third apertures receiving a portion of said locking mechanism when said secondary housing is in said engaged position.

9. The securing mechanism of claim 8, wherein said locking mechanism is a padlock.

10. The securing mechanism of claim 8, wherein said locking mechanism is a locking screw.

11. A securing mechanism for limiting access to a plurality of I/O ports of an electronic instrument, comprising:

a first housing portion attached to a wall of said electronic instrument adjacent to said plurality of I/O ports, said first housing portion having a least one side;

a second housing portion mechanically coupling with said first housing in an engaged position to form an enclosure surrounding said plurality of I/O ports of said electronic instrument;

said enclosure including an aperture allowing passage of a cable of a connector to be connected to one of said I/O ports;

said first housing portion and said second housing portion cooperating when in said engaged position to prevent a connection of a connector to an unoccupied one of said I/O ports;

said first housing portion and said second housing portion cooperating when in said engaged position to prevent removal of a connector from an occupied one of said I/O ports; and a locking mechanism for locking said first and second housing portions in said engaged position.

12. The securing mechanism of claim 11, wherein said first housing portion has a second aperture, said second housing portion has a third aperture; and said second and third apertures are axially aligned when said first and second housing portions are in said engaged position;

said second and third apertures receiving a portion of said locking mechanism when said first and second housing portions are in said engaged position.

13. The securing mechanism of claim 12, wherein said locking mechanism is a padlock.

14. The securing mechanism of claim 12, wherein said locking mechanism is a locking screw.

15. An electronic instrument, comprising:

an enclosure, said enclosure of said electronic instrument having a wall, said wall providing access to a plurality of I/O ports of said electronic instrument;

a security device having a first part and a second part;

said first part being attached to said wall of said electronic instrument adjacent to said plurality of I/O ports;

said first part bounding said plurality of I/O ports on three sides, and being open on a fourth side;

said first part having a partial cover forming an opening extending toward an edge of said partial cover from said fourth side;

said second part sliding within said first part to bound said I/O ports on said fourth side;

said second part having a cover portion cooperating with said partial cover of said first part to form an aperture, said aperture reducing in size as said second part moves to an engaged portion within said first part;

when said second part is in said engaged position, said size of said aperture allows outward passage of a cable of said connector connected to one of said I/O ports, does not allow outward passage of said connector through said aperture, and prevents coupling of a second connector to an unoccupied I/O connector by not allowing inward passage of said second connector through said aperture; and a locking mechanism for locking said second part in said engaged position.

16. The electronic instrument of claim 15, wherein an area of said first part has a second aperture, an area of said second part has a third aperture; said second and third apertures being axially aligned when said second portion is in said engaged position;

said alignment of said second and third apertures allowing installation of a portion of said locking mechanism through said second and third apertures.

17. The electronic instrument of claim 16, wherein said locking mechanism is a padlock.

18. The electronic instrument of claim 16, wherein said locking mechanism is a locking screw.

* * * * *